No. 635,838. Patented Oct. 31, 1899.
J. W. BETTENDORF.
CHECK ROWER.
(Application filed June 30, 1399.)
(No Model.) 2 Sheets—Sheet 1.
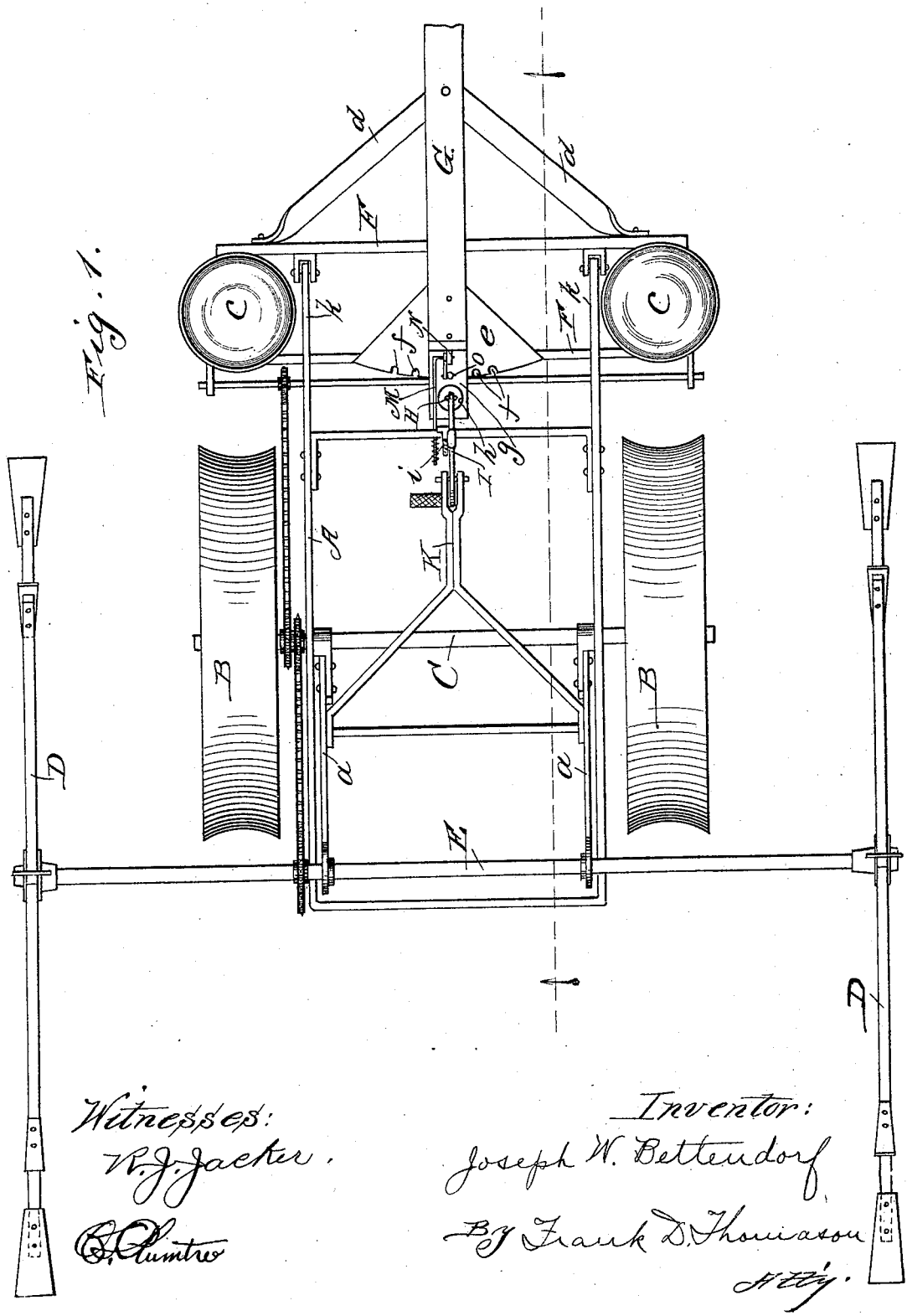
Witnesses:
R. J. Jacker.
B. Plumtre
Inventor:
Joseph W. Bettendorf
By Frank D. Thomason
Atty.

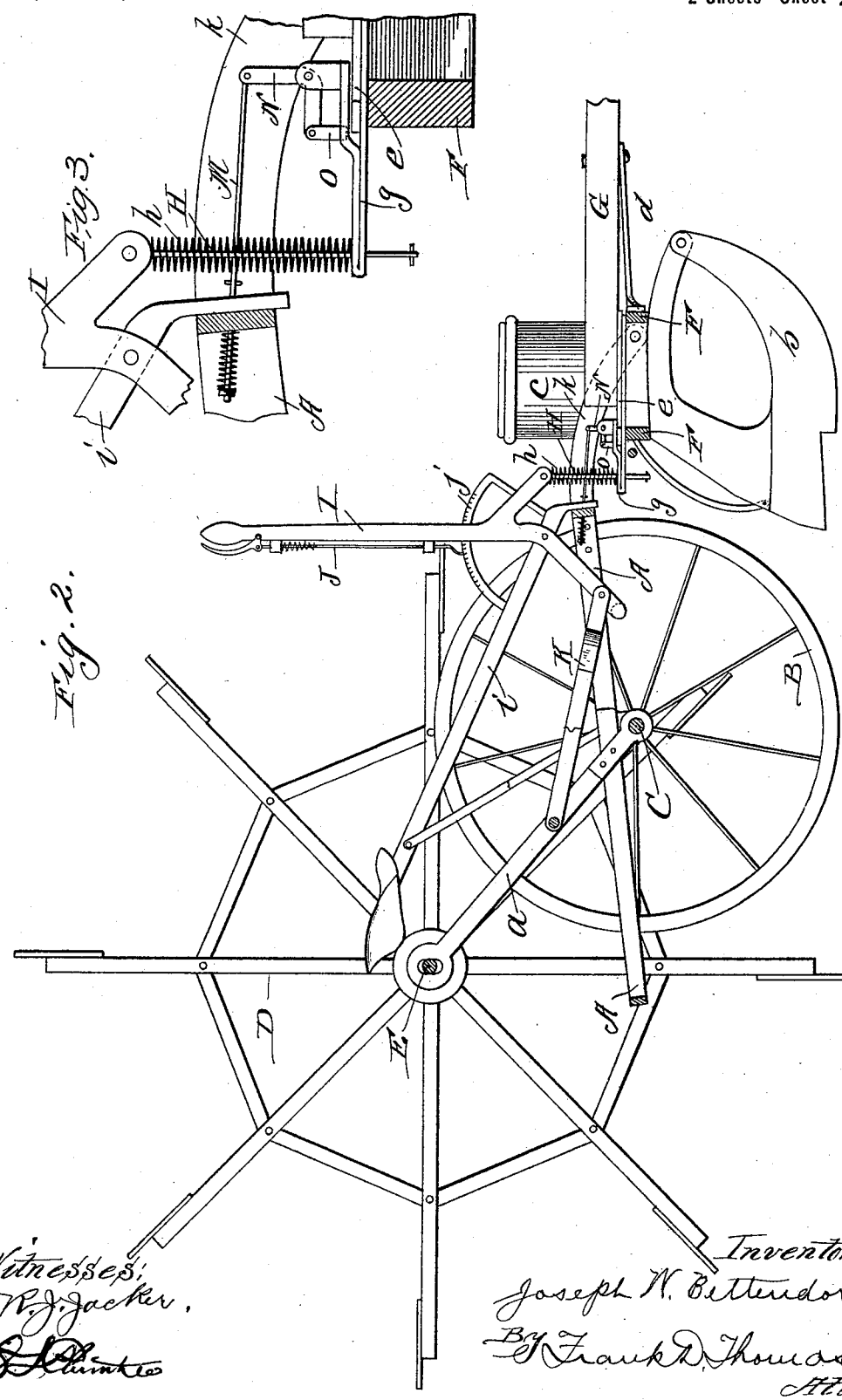

UNITED STATES PATENT OFFICE.

JOSEPH W. BETTENDORF, OF DAVENPORT, IOWA.

CHECK-ROWER.

SPECIFICATION forming part of Letters Patent No. 635,838, dated October 31, 1899.

Application filed June 30, 1899. Serial No. 722,438. (No model.)

*To all whom it may concern:*

Be it known that I, JOSEPH W. BETTENDORF, a citizen of the United States, and a resident of Davenport, in the county of Scott and State of Iowa, have invented certain new and useful Improvements in Check-Rowers, of which the following is a full, clear, and exact specification.

The object of my invention is to prevent the marker-wheels of a self-actuated check-rower from being deflected from a straight line by the accidental deviations of the horses from the intended line of draft. This I accomplish by the means hereinafter fully described and as particularly pointed out in the claims.

In the drawings, Figure 1 is a plan view of my invention. Fig. 2 is a longitudinal central section thereof. Fig. 3 is a detail view illustrating the tongue-locking mechanism.

In the drawings, A represents a suitable supporting-frame, which is preferably rectangular and is supported by wheels B for covering the furrow into which the seed is deposited. The axle C for these wheels B intersects frame A about midway its length and has secured to and projecting rearward from it the corresponding rigid arms *a*. A transverse shaft E is journaled in the rear portion of arms *a*, and when said axle is in its normal position the plane of these arms is such that the spade-shaped ends of the spider marking-wheels D D on the ends of said shaft E will enter the tilled soil and leave a series of alining depressions which are easily discernible to and serve as a guide for the operator when planting. The openings in arms *a* in which shaft E is journaled are elongated vertically, so as to permit the said shaft to have a limited independent vertical play to enable the marker-wheels D to adapt themselves to irregularities of the surface over which they travel.

Arranged in front of frame A and mainly supported by the shares or furrow-openers *b b* under the hoppers *c c* is a rectangular hopper-frame F, to which, however, I make no claim to inventorship further than may be involved in providing the forward transverse member thereof with a forwardly-projecting V-shaped bracket *d*, to the vertex of which the tongue G is pivoted in a suitable manner.

The rear end of tongue G is provided with a horizontally-disposed flat segmental plate *e*, the rear curved edge of which has a series of recesses *f* in it and is held in its relative position to the rear transverse member of the hopper-frame by a hook-shaped bent guide-bracket *g*, that is suitably secured to and projects from about the center of length of the rear transverse member of the hopper-frame. The doubled part of this bracket *g* projects somewhat to the rear of the edge of plate *e* and affords a support for the lower end of a coil-spring *h*, which surrounds a rod H, that is pivotally secured to the lower forwardly-bent arm of the lever I. Lever I is pivoted to the lower portion of the seat-supporting bar *i* and is provided with the usual form of spring-catch J, which engages the serrated edge of the segmental frame *j* to enable the operator to maintain said lever in any position to which it may be thrown.

The lower branch of lever I has pivotally connected thereto the forward end of a link K, which preferably has its rear end bifurcated and the bifurcations thereof spread apart at a suitable angle and pivotally connected to arms *a a*, about as shown.

The side members of the supporting-frame A are provided with corresponding forwardly-projecting downwardly-curved extensions *k* *k*, the forward extremities of which are pivoted to the forward member of the hopper-frame F, about as shown. Now when lever I is drawn rearward the spider marker-wheels are raised. If the tongue is raised, no matter at what angle to the line of draft it may be in, the entire hopper-frame is tilted, thus increasing the distance between the rear transverse member of the hopper-frame and the forward transverse member of the supporting-frame A, and thereby so affecting a rod M, which extends longitudinally through the forward member of frame A and has a coil-spring surrounding its rear extension, that it operates a bell-crank N, fulcrumed to lugs arising from plate *e*, and causes the bolt *o*, pivoted to and depending from the rearwardly-extending branch of bell-crank N, to shoot through a suitable opening in bracket *g* and into one of the recesses in the rear edge of plate *e* to lock the tongue. This raising and locking of the tongue enables the machine to be reversed within a very short compass, which, considering the character of the machine, it will readily be seen is most desirable. If the elevation of the tongue is greater than would be required to lock the same, the entire supporting-frame A, through the medium of the rod H, would tilt forward, and thereby raise the markers from the ground.

I do not attach any particular importance to the construction of either the supporting-frame A or the hopper-frame, so long as they permit the accomplishment of the main features of my invention, and as my invention relates almost entirely to the objects set forth in the statement of this specification—namely, maintaining the course of the markers in a straight line, so that they will not be affected by the slight deviations of the draft-animals from the line of draft—it is obvious the pivotal position of the draft-gear in front of and disconnected from the axle C is most important.

What I claim as new, and desire to secure by Letters Patent, is—

1. In a check-rower planter the combination with the supporting-frame, running-gear therefor, corresponding spider-markers, shaft for the same journaled and revolving in a permanent transverse plane, hoppers, seed-feeding devices, and means for operating same, of draft-gear pivotally connected to said frame at a point disconnected from and forward of the axle of the running-gear.

2. In a check-rower planter, the combination with the supporting-frame, running-gear therefor, corresponding spider-markers, shaft for the same journaled and revolving in a permanent transverse plane, hoppers, seed-feeding devices, and means for operating the same, of the draft-gear pivotally connected in a horizontal plane to said frame at a point intermediate or forward of the transverse plane of said hoppers.

3. In a check-rower planter, the combination with the marking and seed-feeding devices, and supporting-frame therefor, of the draft-gear pivotally connected to the supporting-frame thereof disconnected from and forward of the running-gear of the same.

4. In a check-rower planter, the combination with the marking and seed-feeding devices, and supporting-frame therefor, of the draft-gear pivotally connected to said supporting-frame intermediate or forward of the seed-feeding devices.

5. In a check-rower planter, the combination with the marking and seed-feeding devices, and a supporting-frame therefor, of a suitable tongue, pivotally connected to said supporting-frame forward of the running-gear thereof, which is free to move laterally when in the proper horizontally-disposed draft plane but becomes rigidly locked to said frame when moved above the said plane.

6. In a check-rower planter, the combination with the seeding devices, and marking devices consisting of corresponding spider-wheels and transverse shaft to which the same are secured, arms in which said shaft is journaled, and a supporting-frame for said planter, of a suitable tongue which when raised moves said arms and lifts said spiders so that their peripheries clear the ground.

7. In a check-rower planter, the combination with the seeding devices, marking devices, consisting of corresponding spider-wheels and transverse shaft to which the same are secured, arms in which said shaft is journaled, and supporting-frame for said planter, of a suitably-pivoted tongue which when raised moves said arms to lift said spiders so that their peripheries clear the ground.

8. In a check-rower planter, the combination with the seeding devices, marking devices consisting of corresponding spider-wheels and transverse shaft to which the same are secured, arms in which said shaft is journaled, and supporting-frame for said planter, of a suitable tongue pivotally connected to said supporting-frame and free to move laterally when in the proper horizontal plane, but when raised above the said plane becomes rigidly locked to said supporting-frame and at the same time moves said arms to lift said spiders so that their peripheries clear the ground.

9. A check-rower planter having a suitable supporting-frame, hoppers, seed-feeding devices, rotary markers operatively connected thereto and actuating the same, and draft-rigging pivotally connected in a horizontal plane to said supporting-frame.

10. A check-rower seed-planter having a suitable supporting-frame, hoppers, seed-feeding devices, rotary markers operatively connected thereto and actuating the same which are journaled in a permanent transverse plane to said supporting-frame, and draft-rigging pivotally connected in a horizontal plane to the said frame.

11. In a check-rower planter, the combination with a hopper-frame, hoppers carried by the same, seed-feeding devices therefor, and draft-rigging pivotally connected in a horizontal plane to said hopper-frame, of rotary markers operatively connected to said seed-feeding devices, and supporting-frame therefor to the forward end of which said hopper-frame is connected.

12. The combination in a check-rower planter, with a suitable supporting-frame, hoppers, seed-feeding devices, rotary markers operatively connected to and actuating the same, of a tongue pivotally secured in a horizontal plane to said frame and normally free to turn independent thereof, and devices for locking the said tongue at an angle to the line of draft when desired.

13. The combination in a check-rower planter with a suitable supporting-vehicle, hopper-frame suitably secured to the same, hoppers, seed-feeding devices therefor, rotary markers operatively connected to and actuating the same, of a tongue pivoted in a horizontal plane to said hopper-frame so as to be normally free to turn independent of the same, the rear end of said tongue extending beyond its pivot, and devices for engaging said rear extensions to lock said tongue at an angle to the line of draft when desired.

14. The combination in a check-rower planter, with a suitable supporting-vehicle, hopper-frame suitably secured to same, hoppers, seed-feeding devices therefor, and rotary markers operatively connected to and actuating the same, of a tongue pivotally secured in a horizontal plane to said hopper-frame so as to be normally free to turn independent of the same, and so that its rear end extends beyond the pivotal point thereof, a horizontally-disposed segmental plate secured to its rear end, and a bolt engaging the rear serrated edge of said plate.

15. The combination in a check-rower planter, with a suitable supporting-vehicle, hopper-frame suitably secured to the same, hoppers, seed-feeding devices therefor, rotary markers operatively connected to and actuating the same, of a tongue pivoted in a horizontal plane to said hopper-frame so as to be free to normally turn independent thereof, and extending to the rear of its pivot, a plate secured to its rear end, and a bolt automatically engaging the rear serrated edge of said plate according to the upward inclination of said tongue to the normal plane of the supporting-vehicle.

16. In a check-rower planter, the combination with the supporting-vehicle and hopper-frame articulated to the front end of the hopper-frame so that its rear end extends beyond the pivotal point thereof, a horizontally-disposed segmental plate secured to its rear end, a bolt o, bell-crank N, and a spring-controlled rod M, connecting said crank to the supporting-vehicle.

17. In a check-rower planter, the combination with the hopper-frame, of the supporting-vehicle to the front end of which the former is articulated, lever I, devices for movably retaining said lever in a given position, rod H, horizontally connecting said lever to the rear end of the hopper-frame, and coiled spring h surrounding said rod.

18. In a check-rower seed-planter, the combination with the supporting-vehicle, of lever I of the first class, devices for movably retaining said lever in a given position, link K connecting the lower arms of said lever to arms a, said arms a pivotally connected to said supporting-vehicle and spider-markers journaled in the rear of the same.

19. In a check-rower planter, the combination with the supporting-vehicle, hoppers, and seed-feeding devices therefor, of retracing spider-markers rotating in a transverse plane to the line of draft of said vehicle, and devices connected to said vehicle in the rear ends of which said markers are journaled and have a limited play.

20. In a check-rower planter the combination with the supporting-vehicle, hoppers, and seed-feeding devices therefor, of retracing spider-markers rotating in a transverse plane to the line of draft of said vehicle, vertically-adjustable devices connected to said vehicle in the rear ends of which said markers are journaled and have limited vertical play.

21. In a check-rower planter, the combination with the supporting-vehicle, hoppers, and seed-feeding devices therefor, of a tongue or draft-rigging pivotally connected in a horizontal plane thereto, of retracing spider-markers rotating in a transverse plane to the line of draft of said vehicle, vertically-adjustable devices connected to said vehicle, in the rear ends of which said markers are journaled and have a limited vertical play.

22. In a check-rower planter, the combination with the supporting-vehicle, hopper-frame articulated to the forward end of the same, hoppers, and seed-feeding devices therefor, and a tongue or draft-rigging pivoted in a horizontal plane to said hopper-frame, of retracing markers rotatable in a transverse plane to the line of draft of said vehicle, and suitably connected to said feeding devices, and devices connected to said vehicle in the rear ends of which said markers are journaled and have a limited vertical play.

JOSEPH W. BETTENDORF.

Witnesses:
HENRY BELLINGHAUSEN,
FRANK GODDARD.